United States Patent Office 3,200,071
Patented Aug. 10, 1965

3,200,071
COMPOSITION AND PROCESS FOR INHIBITING CORROSION OF FERROUS METAL
Verner L. Stromberg, Webster Groves, Mo., assignor to Petrolite Corporation, Wilmington, Del., a corporation of Delaware
No Drawing. Filed Nov. 1, 1961, Ser. No. 149,161
6 Claims. (Cl. 252—8.55)

This invention relates to compositions comprising a mixture of a hydroxyaliphatic cyclic amidine, a cycloaliphatic amine and an aryl sulfonic acid. This invention also relates to the use of this mixture as a corrosion inhibitor in preventing the corrosion of metals, most particularly iron, steel and ferrous alloys. These corrosion inhibitors are particularly useful in preventing the corrosion of oil well equipment, for example, in producing wells, pipe lines, refinery storage tanks, etc. which are in contact with corrosive oil-containing media, for example in oil wells producing corrosion oil or oil-brine mixtures, in refineries, and the like.

THE HYDROXYALIPHATIC CYCLIC AMIDINE

The expression "cyclic amidine" is employed in its usual sense to indicate ring compounds in which there are present either 5 or 6 members, and having 2 nitrogen atoms separated by a single carbon atom supplemented by either two additional carbon atoms or three additional carbon atoms completing the ring. All the carbon atoms may be substituted. In the present instance the nitrogen atom of the ring involving two monovalent linkages (the 1-position) is substituted with a hydroxy aliphatic group, i.e., —(RO)$_n$H group when R is alkylene and $n$ is a whole number, for example, 1–5 or higher.

These cyclic amidines are further characterized at being substituted imidazolines and tetrahydropyrimidines in which the two-position carbon of the ring is generally bonded to a hydrocarbon or comparable radical derived from an acid, such as a low molal fatty acid, a high molal fatty acid, or comparable acids, polycarboxy acids, and the like.

For details of the preparation of imidazolines substituted in the 2-position from amines, see the following U.S. patents, U.S. No. 1,999,989, dated April 30, 1935, Max Bockmuhl et al., U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem. Rev. 54, 593 (54).

Equally suitable for use in preparing compounds useful in our invention and for the preparation of tetrahydropyrimidines substituted in the 2-position are the corresponding polyamines containing at least one primary amino group and one secondary amino group, or another primary amino group separated from the first primary amino group by three carbon atoms instead of being separated by only 2 carbons as with imidazolines. This reaction as in the case of the imidazoline is generally carried out by heating the reactants to a temperature at which 2 moles of water are evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Kiescher, Ernest Urech and Willi Klarer and U.S. Patent No. 2,194,419, dated March 19, 1940, to August Chwala.

Substituted imidazolines and tetrahydropyrimidines are obtained from a variety of acids beginning with the one-carbon acid (formic) through and including higher fatty acids or the equivalent having as many as 30 carbon atoms for example from 8–22 carbons. Modified fatty acids also can be employed as, for example, phenyl stearic acid or the like. Cyclic acids may be employed, including naphthenic acids. A variety of other acids including benzoic acid, substituted benzoic acid, alicyclic acid, and the like, have been employed to furnish the residue $$R\overset{\text{O}}{\underset{}{C}}-$$

from the acid RCOOH in which the C of the residue $$R\overset{\text{O}}{\underset{}{C}}-$$

is part of the ring. The fatty acids employed, for example, may be saturated or unsaturated. They may be hydroxylated or non-hydroxylated. Branched long chain fatty acids may be employed. See J. Am. Chem. Soc. 74, 2523 (152). This applies also to the lower molecular weight acids as well.

Among sources of such acids may be mentioned straight chain and branched chain, saturated and unsaturated, aliphatic, cycloaliphatic, aromatic hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, hyristic, pentadecanoic, palmitic, heptadecanoic, stearic, nonadecanoic, eicosanoic, heneicosanoic, docosanoic, tricosanoic, tetracosanoic, pentacosanoic, cerotic, hepatcosanoic, montanic, nonacosanoic, melissic and like.

Examples of ethylenic unsaturated aliphatic acids comprise: acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecnenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octo decenoic acids, for example, petrosilenic acid, oleic acid, elidic acid, the nonadecenoic acids, for example, the eicosenoic acids, the docosenoic acids, for example, erucic acid, brassidic acid, cetoleic acid, the tetracosenic acids, and the like.

Examples of dienoic acids comprises the pentadienoic acids, the hexadienoic acids, for example, sorbic acid, the octadienoic acids, for example, linoleic, and the like.

Examples of the trienoic acids comprise the octadecatrienoic acids, for example, linolenic acids, eleostearic acid, pseudoeleostearic acid, and the like.

Carboxylic acids containing functional groups such as hydroxy groups can be employed. Hydroxy acids, particularly the alpha hydroxy acids, comprise glycolic acid, lactic acid, the hydroxyvaleric acids, the hydroxy caproic acids, the hydroxyhepatonic acids, the hydroxycaprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxy palmitic acids, the hydroxylhexadecanoic acids, the hydroxyheptadecanoic acids, the hydroxy stearic acids, the hydroxy octadecynoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyl lactic acid, acetyl ricinoleic acid, chloroacetyl ricinoleic acid, and the like.

Examples of the cyclic aliphatic carboxylic acid comprise those found in petroleum called naphthentic acids, chaumoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acids, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from the various waxes, such as beeswax, spermaceti, montan wax, Japan wax, coccerin and carnuba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic and abietic acid; aralkyl and aromatic acids, such as Twitchell fatty acids, napththoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, aconitic acids, and the like.

Examples of aromatic polycarboxylic acids comprise phathalic, isophthalic acids, terephthalic acids, substituted derivatives thereof (e.g., alkyl, chloro, alkoxy, etc. derivatives), biphenyldicarboxylic acid, diphenylether, dicarboxylic acids, diphenylsulfone dicarboxylic acids and the like.

Higher aromatic polycarboxylic acids containing more the two carboxylic groups comprise hemimellitic, trimellitic, trimesic, mellophanic, prehnitic, pyromellitic acids, mellitic acid, and the like.

Other polycarboxylic acids comprise the dimeric trimeric and poly acids, for example, the Emery Industries polymeric acids such as those described in U.S. Patent 2,263,612, and the like. Other polycarboxylic acids comprise those containing ether groups, for example diglycollic acid. Mixtures of the above acids can be advantageously employed.

In addition, acid precursors such as esters, acid chlorides, glycerides, etc. can be employed in place of the free acid.

Hydroxy substituted imidazolines and tetrahydropyrimidines are obtained in the manner described above from a wide variety of polyamines containing hydroxy groups. Thus, where one starts with a polyamine, for example, a diamine of the following formula

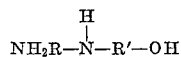

or

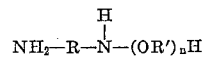

where R has 2 or 3 carbon main chains one obtains the hydroxyalkylene compounds useful in this invention. In addition, one can start with ethylene diamine or with 1,2-propylene diamine, 1,3-propylenediamine or other polyamines and then react the cyclic amidine so obtained with alkylene oxides so as to produce a terminal hydroxyl group since the nitrogen bonded hydrogen on the 1-position on the group reacts with alkylene oxides. In addition the hydroxyalkylene groups can be oxyalkylated.

Alkylene oxides comprise those of the general formula,

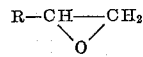

where R is H or an alkyl group. Among the alkylene oxides that may be employed are ethylene, propylene, butylene, octylene, etc. oxides, etc. Other oxyalkylation agents such as glycide, epichlorohydrin, etc., can be employed.

Thus, compounds, within the scope of this invention which react with polycarboxylic acids comprise compounds of the formulae:

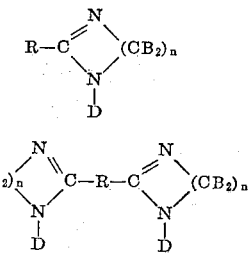

where

is the residue derived from the carboxylic acid, where R is a hydrocarbon radical having, for example, up to about 36 carbon atoms such as 1–36 carbon atoms, and hydrocarbons in which the carbon atom chain is interrupted by oxygen, etc., $n$ is 2 or 3, and B is a hydrogen or a hydrocarbon radical, for example, a lower alkyl radical; and D is a hydroxy-aliphatic radical, for example, —ROH or —R—(OR')$_n$OH, wherein $n$ is a whole number, for example, 1–10 or more but preferably 1–5 and $(CB_2)_n$ is, for example, a divalent radical of the formula:

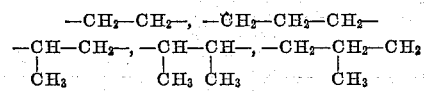

etc.

In general, the hydroxyalkyl cyclic amidines are prepared by reacting a polyamine containing a terminal alkanol group with a carboxylic acid at temperatures of from 150–175° C. employing an azeotroping agent such as xylene to remove water. The reaction time of 3–4 hours is employed. Completion of reaction is judged by the separation of 2 moles of $H_2O$ for each carboxylic acid group. The products in general are dark viscous oil. Since the preparation of cyclic amidines is so well known (see above cited patents), it is not believed that any examples are necessary to illustrate such a well known procedure. However, for purposes of illustration the following examples are included.

EXAMPLE 10a

A solution of 1 mole of hydroxyethyl ethylene diamine,

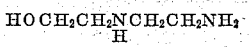

and 1 mole of oleic acid in 300 grams of xylene are charged to a flask and brought to reflux, the mixture being heated under a Dean-Stark water trap condenser in order to distill off the water-xylene azeotrope mixture, separate the water and to continuously return xylene to the reaction mixture. Reflux is continued at a temperature of 160–170° C. for about 3½ hours until about 2 moles of water are removed. The product is

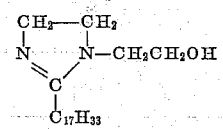

EXAMPLE 9b

The above example is repeated except that hydroxyethyl propylene diamine 1-3,

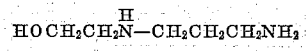

is employed in place of hydroxyethylethylene diamine and stearic acid is employed in place of oleic acid. The product is

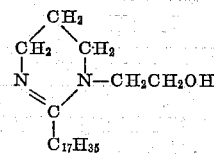

EXAMPLE 4c

Example 10a is repeated except that

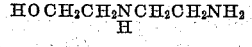

(2 moles) and a polycarboxylic acid, sebacic acid (1 mole), are employed. Instead of two moles of water being removed, as in the prior example, 4 moles of water are removed. The product is

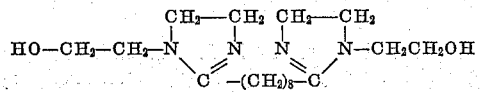

EXAMPLE 20d

Example 4c is repeated with

(2 moles) and the polycarboxylic acid is terephthalic acid (1 mole). As in the prior example, 4 moles of water are removed. The product is

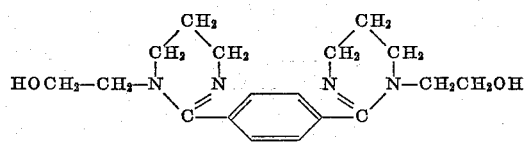

In general, to form the polyoxyalkylated hydroxy cyclic amidines, the hydroxyalkylcyclic amidine is first prepared in the manner shown above and then reacted with alkylene oxides by the conventional manner of oxyalkylation to the desired degree of oxyalkylation using a jacketed stainless steel autoclave in the manner described in U.S. Patent 2,792,369. The following examples are illustrative:

EXAMPLE 11a

One mole of

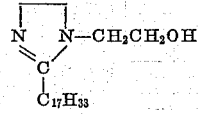

is reacted with 1 mole of ethylene oxide at a temperature of 125–130° C. and a pressure of 10–15 p.s.i. The time regulator is set to add ethylene oxide over ½ hour followed by additional stirring for another ½ hour to insure complete reaction. Ethylene oxide is readily taken up by the reactants. The product is

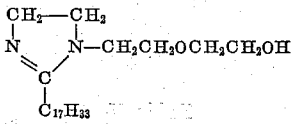

EXAMPLE 12a

The above example is repeated using a propylene oxide and

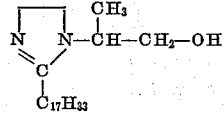

under similar conditions.

The product

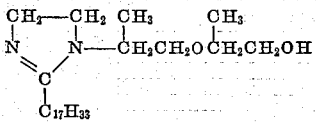

EXAMPLE 28a

Example 11a is repeated except that 2 moles of ethylene oxide are employed. The product is

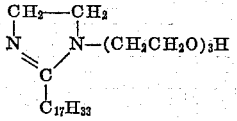

The above examples are typical methods of preparation. The following hydroxycyclic amidines are prepared by these methods.

Table I

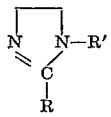

| Ex. No. | RCOOH source of RC | R' |
|---|---|---|
| 1a | Lauric | $CH_2CH_2OH$. |
| 2a | Hexanoic | $CH_2CH_2OH$. |
| 3a | Isovaleric | $CH_2CH_2OH$. |
| 4a | Stearic | $CH_2CH_2OH$. |
| 5a | Melissic | $CH_2CH_2OH$. |
| 6a | Phenyl Stearic | $CH_2CH_2OH$. |
| 7a | Benzoic | $CH_2CH_2OH$. |
| 8a | Creosotinic | $CH_2CH_2OH$. |
| 9a | Naphthenic | $CH_2CH_2OH$. |
| 10a | Oleic | $CH_2CH_2OH$. |
| 11a | Oleic | $CH_2CH_2OCH_2CH_2OH$. |
| 12a | Oleic | $(CH_3)CH_2CH_2O(CH_3)CH_2CH_2OH$. |
| 13a | Lauric | $CH_2CH_2OCH_2CH_2OH$. |
| 14a | Palmitic | $CH_2CH_2OCH_2CH_2OH$. |
| 15a | Cerotic | $CH_2CH_2OCH_2CH_2OH$. |
| 16a | p-tert-Butyl benzoic | $CH_2CH_2OCH_2CHOH$. |
| 17a | Benzoic | $CH_2CH_2OCH_2CH_2OH$. |
| 18a | Toluic | $CH_2CH_2OCH_2CH_2OH$. |
| 19a | Naphthenic | $CH_2CH_2OCH_2CH_2OH$. |
| 20a | Benzoic | $CH_2CH_2OCH_2CH_2OH$. |
| 21a | Formic | $CH_2CH_2OC_2H_2CH_2OCH_2CH_2OH$. |
| 22a | Methyloctadecanoic | $CH_2CH_2OC_2H_2CH_2OCH_2CH_2OH$. |
| 23a | Capric | $CH_2CH_2OC_2H_2CH_2OCH_2CH_2OH$. |
| 24a | Stearic | $CH_2CH_2OC_2H_2CH_2OCH_2CH_2OH$. |
| 25a | Phenylstearic | $CH_2CH_2OC_2H_2CH_2OCH_2CH_2OH$. |
| 26a | Cresotinic | $CH_2CH_2OC_2H_2CH_2OCH_2CH_2OH$. |
| 27a | Linoleic | $CH_2CH_2OC_2H_2CH_2OCH_2CH_2OH$. |
| 28a | Oleic | $CH_2CH_2OC_2H_2CH_2OCH_2CH_2OH$. |
| 29a | 3-methoxybenzoic | $CH_2CH_2OC_2H_2CH_2OCH_2CH_2OH$. |
| 30a | Naphthenic | $CH_2CH_2OC_2H_2CH_2OCH_2CH_2OH$. |

Table II

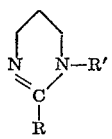

| Ex. No. | RCOOH Source of RC | R' |
|---|---|---|
| 1b | Formic | $CH_2CH_2OH$. |
| 2b | Acetic | $CH_2CH_2OH$. |
| 3b | Butyric | $CH_2CH_2OH$. |
| 4b | Valeric | $CH_2CH_2OH$. |
| 5b | Isovaleric | $(CH_3)CH_2CH_2OH$. |
| 6b | Trimethyl Acetic | $CH_2CH_2OH$. |
| 7b | Pelargonic | $CH_2CH_2OH$. |
| 8b | Lauric | $CH_2CH_2OCH_2CH_2OH$. |
| 9b | Stearic | $CH_2CH_2OH$. |
| 10b | Arachidic | $CH_2CH_2OH$. |
| 11b | Eicosane-carboxylic | $(CH_3)CH_2CH_2OH$. |
| 12b | Cerotic | $CH_2CH_2OH$. |
| 13b | Melissic | $CH_2CH_2OH$. |
| 14b | Phenyl Stearic | $CH_2CH_2OH$. |
| 15b | Benzoic | $CH_2CH_2OCH_2CH_2OH$. |
| 16b | b-methylbenzoic acid | $CH_2CH_2OH$. |
| 17b | Cresotinic | $CH_2CH_2OH$. |
| 18b | p-methylbenzoic | $CH_2CH_2OH$. |
| 19b | P-tert-Butylbenzoic | $CH_2CH_2OH$. |
| 20b | 3-methoxy benzoic | $CH_2CH_2OH$. |
| 21b | Oleic | $CH_2CH_2OH$. |
| 22b | Undecylenic | $CH_2CH_2OH$. |
| 23b | Linoleic | $CH_2CH_2OH$. |
| 24b | Butyric | $CH_2CH_2OH$. |
| 25b | Methyloctadecanoic | $CH_2CH_2OH$. |

Table III

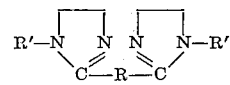

| Ex. No. | HOOC-R-COOH Source of -CRC- | R' |
|---|---|---|
| 1c | Malonic | $CH_2CH_2OH$. |
| 2c | Adipic | $CH_2CH_2OH$. |
| 3c | Suberic | $CH_2CH_2OH$. |
| 4c | Sebacic | $CH_2CH_2OH$. |
| 5c | Nonodecane dicarboxylic | $CH_2CH_2OH$. |
| 6c | Diglycolic | $CH_2CH_2OH$ |
| 7c | Ethylene Bis glycolic | $CH_2CH_2OH$. |
| 8c | Methylene dibenzoic | $CH_2CH_2OH$. |
| 9c | Stearyl Malonic | $CH_2CH_2OH$. |
| 10c | Phtahlic | $CH_2CH_2OH$. |
| 11c | Succinic | $CH_2CH_2OCH_2CH_2OH$. |
| 12c | Glutaric | $CH_2CH_2OCH_2CH_2OH$. |
| 13c | Pimelic | $CH_2CH_2OCH_2CH_2OH$. |
| 14c | Azelaic | $CH_2CH_2OCH_2CH_2OH$. |
| 15c | Eicosane dicarboxylic | $CH_2CH_2OCH_2CH_2OH$. |
| 16c | Dilinoleic | $CH_2CH_2OCH_2CH_2OH$. |
| 17c | Isophthalic | $CH_2CH_2OCH_2OH$. |
| 18c | Diglycolic | $CH_2CH_2OCH_2CH_2OH$. |
| 19c | Lauryl Malonic | $CH_2CH_2OCH_2CH_2OH$. |
| 20c | Methylene dibenzoic | $CH_2CH_2OCH_2CH_2OH$. |
| 21c | Malonic | $CH_2CH_2OC_2H_2CH_2OCH_2CH_2OH$. |
| 22c | Succinic | $CH_2CH_2OC_2H_2CH_2OCH_2CH_2OH$. |
| 23c | Suberic | $CH_2CH_2OC_2H_2CH_2OCH_2CH_2OH$. |
| 24c | Pimelic | $CH_2CH_2OC_2H_2CH_2OCH_2CH_2OH$. |
| 25c | Nonedecane dicarboxylic | $CH_2CH_2OC_2H_2CH_2OCH_2CH_2OH$. |
| 26c | Diglycolic | $CH_2CH_2OC_2H_2CH_2OCH_2CH_2OH$. |
| 27c | Methylene dibenzoic | $CH_2CH_2OC_2H_2CH_2OCH_2CH_2OH$. |
| 28c | Stearyl malonic | $CH_2CH_2OC_2H_2OCH_2CH_2OH_2OH$. |
| 29c | Stearyl succinic | $CH_2CH_2OC_2H_2CH_2OCH_2CH_2OH$. |
| 30c | Terephthalic | $CH_2CH_2OC_2H_2CH_2OCH_2CH_2OH$. |

Table IV

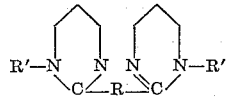

| Ex. No. | HOOC-R-COOH Source of -CRC- | R' |
|---|---|---|
| 1d | Malonic | $CH_2CH_2OH$. |
| 2d | Succinic | $CH_2CH_2OH$. |
| 3d | Glutaric | $CH_2CH_2OH$. |
| 4d | Adipic | $CH_2CH_2OH$. |
| 5d | Suberic | $(CH_3)CH_2CH_2OH$. |
| 6d | Sebacic | $CH_2CH_2OH$. |
| 7d | Pimelic | $CH_2CH_2OCH_2CH_2OH$. |
| 8d | Azelaic | $CH_2CH_2OH$. |
| 9d | Nonodecane dicarboxylic | $CH_2CH_2OH$. |
| 10d | Eicosane dicarboxylic | $CH_2CH_2OH$. |
| 11d | Diglycolic | $CH_2CH_2OH$. |
| 12d | Ethylene bisglycolic | $(CH_3)CH_2CH_2OH$. |
| 13d | Methylene dicarboxylic acid | $(CH_3)CH_2CH_2OH$. |
| 14d | Dilinoleic | $CH_2CH_2OH$. |
| 15d | Stearyl malonic | $CH_2CH_2OH$. |
| 16d | Lauryl succinic | $CH_2CH_2OH$. |
| 17d | Isotetradecyl succinic | $CH_2CH_2OH$. |
| 18d | Phthalic | $CH_2CH_2OCH_2CH_2OH$. |
| 19d | Isophthalic | $CH_2CH_2OH$. |
| 20d | Terephthalic | $CH_2CH_2OH$. |
| 21d | Glutaconic | $CH_2CH_2OH$. |
| 22d | Sebacic | $CH_2CH_2OH$. |

CYCLOALIPHATIC AMINES

Cycloaliphatic amines include those of the formula

where at least one of the R groups is a cycloaliphatic group, and the other R's are hydrogen or a substituted group, preferably hydrocarbon, for example alkyl. Thus, R may be

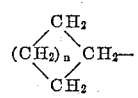

where $n=0-5$, but preferably 3. Examples include cyclopropyl, cyclobutyl, cyclopentyl, cyclohexyl, cycloheptyl, etc. radicals.

In addition, the cycloaliphatic group may be substituted, for example, with a hydrocarbon group, such as an alkyl group, for example

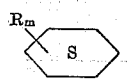

where R is alkyl and m=0–5, for example

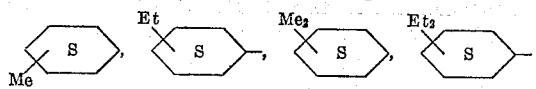

etc.

Although it is preferred that the non-cycloaliphatic groups be hydrogen, other substituted groups can be employed, for example alkyl groups.

Thus, the term "cycloaliphatic amine" as employed herein and in the claims refers to both substituted and unsubstituted cycloaliphatic amines wherein the amino group contains at least one cycloaliphatic group and the remaining nitrogen valences of the amino group are satisfied with hydrogen or a substituted group such as alkyl.

The preferred species is cyclohexyl amine.

SULFONIC ACIDS

Sulfonic acids may be described by the following formula $$R_n - \text{(Ar)} - (SO_3H)_m$$

where n=zero or a number determined by the number of available hydrogen groups on the aromatic ring (Ar) which can be substituted by R where R is a substituted group, preferably alkyl, and m is 1 or greater.

Examples of suitable sulfonic acids are presented in the following table:

Table V

AROMATIC NUCLEUS (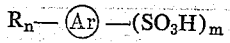)
A. Benzene
B. Toluene
C. Xylenes, ethyl benzene, mesitylene, cymene, etc.
D. Phenol
E. Cresols, xylenols, and lower alkylated phenols
F. Phenol ethers, anisole, phenetole, etc.
G. Diaryl ethers, diphenyl ether, etc.
H. Naphthalene
I. Naphthols
J. Naphthol ethers
K. Diphenyl
L. Phenyl phenols
M. Di- and triphenyl methanes
N. Benzoins and desoxybenzoins
O. Rosin and modified rosins

ALKYL GROUP (R)

(1) Methyl and ethyl
(2) Propyl
(3) Butyl
(4) Amyl
(5) Hexyl
(6) Heptyl
(7) Straight-chain octyl
(8) Octyl, 2-ethylhexyl
(9) Octyl, diisobutyl
(10) Nonyls
(11) Decyls
(12) Keryls
(13) Straight-chain alkyl $C_{9-18}$
(14) Straight-chain hydroxylated or unsaturated alkyl, oleyl, ricinoleyl. These may be attached to one or more aromatic nuclei
(15) Mixed alkyl from cracked paraffin wax olefins
(16) Mixed alkyl from polymers of $C_3$–$C_7$ monoolefins
(17) Mixed alkyl from naphthenes
(18) Terpenoid, from terpene olefins or alcohols
(19) Oleic acid derivative condensates, condensed through the double bond of the oleic chain
(20) Acyl groups, i.e., alkyl aromatic ketones usually made by a Friedel-Crafts acylation reaction
(21) Branched alkyl group derived from a ketone or aldehyde
(22) Olefins from misc. synthetic processes
(23) Steroid and complex alkyl-aromatic Oil soluble aromatic petroleum sulfonates may be expressed by the generic formula $$C_nH_{(2n-10)}SO_3H$$

The following compositions are presented for purposes of illustration and not of limitation.

Table VI

| Ex. | (1) Cyclic Amidine | Cycloaliphatic (2) Amine | Aromatic Sulfonic (3) Acid 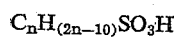 | Molar Ratio 1:2:3 |
|---|---|---|---|---|
| 1e | N–N–CH₂CH₂OH, C=C₁₇H₃₃ | Cyclohexyl Amine | Naphthalene Sulfonic Acid | 1:2:2 |
| 2e | N–N–CH₂CH₂OH, C=C₁₇H₃₃ | Dicyclohexyl Amine | Benzene Sulfonic Acid | 1:1:1 |
| 3e | N–N–CH₂CH₂OH, C=C₁₇H₃₅ | Methyl Cyclohexyl Amine | Toluene Sulfonic Acid | 5:2:2 |
| 4e | HOCH₂H₂CN–N–N–N–CH₂CH₂OH, C–(CH₂)₈–C | Cyclohexyl Amine | Dodecylbenzene Sulfonic Acid | 1:3:3 |
| 5e | HOCH₂CH₂–N–N–N–N–CH₂CH₂OH, C–(CH₂)₈–C | Diethyl Cyclohexyl Amine | Didodecylbenzene Sulfonic Acid | 1:2:2 |

Table VI—Continued

| Ex. | (1) Cyclic Amidine | Cycloaliphatic (2) Amine | Aromatic Sulfonic (3) Acid | Molar Ratio 1:2:3 |
|---|---|---|---|---|
| 6e | N—N—(CH$_2$CH$_2$O)$_2$H, C, C$_{17}$H$_{33}$ | Cyclohexyl Amine | Mesitylene Sulfonic Acid | 0.5:2:2 |
| 7e | N—N—CH(CH$_3$)—CH$_2$OH, C, C$_{17}$H$_{33}$ | ___do___ | Napthalene Sulfonic Acid | 10:5:3 |
| 8e | N—N—(CH$_2$CH$_2$O)$_3$H, C, C$_{17}$H$_{33}$ | ___do___ | Diphenyl ether Sulfonic Acid | 1:5:5 |
| 9e | N—N—CH$_2$CH$_2$OH, C, C$_{11}$H$_{23}$ | ___do___ | Napthalene Sulfonic Acid | 1:2:2 |

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658, dated February 28, 1954, to Pfohl et al., and 2,756,211, dated July 24, 1956, to Jones, and 2,727,003, dated December 13, 1955, to Hughes.

More specifically then, and particularly from the standpoint of oil production, this aspect of the invention relates to inhibiting corrosion caused by hydrogen sulfide, carbon dioxide, inorganic and organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it is possible to effectively control corrosion by the addition of as little as 5 p.p.m. of our new compositions to the well fluids, whereas in other wells, one may add 5,000–10,000 p.p.m. or more. However, for economic consideration less than 2,000 p.p.m are employed.

In using the improved compositions for protecting oil well tubing, casing and other equipment which comes in contact with the corrosive oil-brine production, excellent results may be obtained by injecting an appropriate quantity of a selected composition into a producing well so that it mingles with the oil-brine mixture and come into contact with the casing, tubing, pumps and other producing equipment. One, for example, can introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic and organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it is dropped into the well as a solid lump or stick, blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from changer to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from 5 parts per million to 2000 parts per million or more parts of corrosive fluid will generally provide protection.

These corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitor thus obtained is often significantly greater than the use of either one alone.

They can also be employed as film-forming corrosion inhibitor in conjunction with the aldehyde sulfoxylate compositions described and claimed in application S.N. 845,325, filed October 9, 1959, now U.S. Patent No. 3,042,609.

As pointed out previously, the addition of corrosion inhibitors, particularly in the form of a solution by means of a metering pump or the like, is common practice. The particular corrosion inhibitors herein described are applied in the same manner as other corrosion inhibitors intended fo use for the same purpose. For sake of brevity, as to the use of the corrosion inhibitor and its solution in a suitable solvent such as mineral oil, methyl ethyl ketone, xylene, kerosene, high boiling aromatic solvent, or even water.

The molar ratios of cyclic amidine to cycloaliphatic amine can vary widely depending upon the particular species employed, the particular corrosive system, etc. provided an effective ratio is employed. Illustrative ratios range from about 50:1 to 1:50, such as from about 20:1 to 1:20, for example from about 1:5 to 5:1, but preferably about 1:3 to 3:1 with an optimum of 1.2.

The moles of sulfonic acid employed can also vary widely, provided an effective amount is employed. Illustrative amounts include the number of moles necessary to neutralize about 10 to 100 mole percent, such as 30–90%, for example 30–70%, but preferably 30–50 mole percent of the total basicity of the cyclic amidine-cycloaliphatic amine mixture, i.e. the number of moles of sulfonic acid required for 10% to full neutrality.

The test employed in evaluating corrosion inhibitors is the copper ion displacement test described in the application S.N. 695,233, now U.S. Patent No. 3,110,567. In general, it is carried out in the following manner:

The test is run by immersing one inch square, sand blasted coupons prepared from 0.006 in. thick shim stock in brine from the corrosive source for five minutes. The coupons are then transferred without drying to a solution of a known concentration of the inhibitor in the oil from the corrosive source where they are allowed to remain for an additional five minutes. The coupons are then transferred to a 10 percent solution of copper sulfate where they are allowed to remain for 30 seconds. Blank determinations are made in the same manner but omitting the inhibitor. The lowest concentration of inhibitor required to prevent the plating of copper is taken as the criterion for a pass.

In the following tests a compound is satisfactory if it has a rating of 1. A rating of 1 indicates that 0–10% of the coupon is copper plated; 2, 10–20% of the coupon is copper plated; 3, 20–30% copper plated, 4, 30–40% copper plated, 5, 40–50%, 6, 50–60%, etc.

The compositions shown in Table VI are effective corrosion inhibitors.

The composition of Example 1e when actually tested in the field on eight different wells produced the following data:

*Table VII*
FIELD CORROSION TESTS

| Ex. | Compound | Well #1 | Well #2 | Well #3 | Well #4 | Well #5 | Well #6 | Well #7 | Well #8 |
|---|---|---|---|---|---|---|---|---|---|
| 1f | A | 3 at 1,400 p.p.m. | 3 at 1,200 p.p.m. | 5 at 1,400 p.p.m. | 3 at 1,600 p.p.m. | 2 at 1,400 p.p.m. | 2 at 1,400 p.p.m. | 2 at 1,800 p.p.m. | 2 at 1,600 p.p.m. |
| 2f | B | 3 at 1,200 p.p.m. | 3 at 1,200 p.p.m. | 1 at 1,400 p.p.m. | 6 at 1,400 p.p.m. | ---------- | ---------- | 6 at 1,800 p.p.m. | 3 at 1,600 p.p.m. |
| 3f | C | 1 at 800 p.p.m. | 1 at 1,000 p.p.m. | 1 at 1,000 p.p.m. | 1 at 1,200 p.p.m. | 1 at 1,000 p.p.m. | 1 at 1,400 p.p.m. | 1 at 1,400 p.p.m. | 1 at 1,400 p.p.m. |

Compound A = 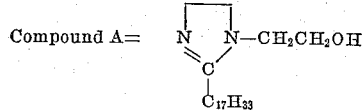

a well known corrosion inhibitor

Compound B = 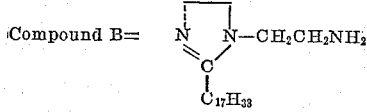

a well known corrosion inhibitor

Compound C = Ex. 1e.

The ratio employed in Example 1e is the optimum ratio (i.e. 1:2:2).

Having thus described my invention, what I claim as new and desire to obtain by Letters Patent is:

1. A corrosion inhibiting composition consisting essentially of a hydroxyaliphatic imidazoline, a cyclohexyl amine and naphthalene sulfonic acid, the molar ratio of said imidazoline to said amine to said sulfonic acid being 1:2:2.

2. A corrosion inhibiting composition consisting essentially of a 1-hydroxyalkyl imidazoline, cyclohexyl amine and naphthalene sulfonic acid, the molar ratio of said imidazoline to said amine to said sulfonic acid being 1:2:2.

3. A corrosion inhibiting composition consisting essentially of (1)

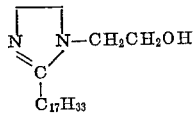

(2) cyclohexyl amine, and (3) naphthalene sulfonic acid, the molar ratio of (1) to (2) to (3) being 1:2:2.

4. The process of inhibiting corrosion of ferrous metals exposed to corrosive agents normally present in producing oil and gas wells comprising introducing into the well a corrosion inhibiting composition consisting essentially of a hydroxyaliphatic imidazoline, a cyclohexyl amine and naphthalene sulfonic acid, the molar ratio of said imidazoline to said amine to said sulfonic acid being 1:2:2.

5. The process of inhibiting corrosion of ferrous metals exposed to corrosive agents normally present in producing oil and gas wells comprising introducing into the well a corrosion inhibiting composition consisting essentially of a 1-hydroxyalkyl imidazoline, cyclohexyl amine and naphthalene sulfonic acid, the molar ratio of said imidazoline to said amine to said sulfonic acid being 1:2:2.

6. The process of inhibiting corrosion of ferrous metals exposed to corrosive agents normally present in producing oil and gas wells comprising introducing into the well a corrosion inhibiting composition consisting essentially of (1)

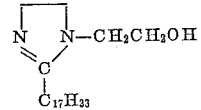

(2) cyclohexyl amine, and (3) naphthalene sulfonic acid, the molar ratio of (1) to (2) to (3) being 1:2:2.

References Cited by the Examiner
UNITED STATES PATENTS

| | | | |
|---|---|---|---|
| 2,468,163 | 4/49 | Blair et al. | 252—8.55 |
| 2,828,259 | 3/58 | Wirtel et al. | 252—8.55 |
| 2,856,358 | 10/58 | Riggs | 252—8.55 |
| 2,882,227 | 4/59 | Lindberg | 252—8.55 |
| 2,888,399 | 5/59 | Wirtel et al. | 252—8.55 |
| 2,940,927 | 6/60 | Hughes | 252—8.55 |
| 3,025,239 | 3/62 | Sheldahl | 252—391 |

JULIUS GREENWALD, *Primary Examiner.*